US009439106B2

(12) United States Patent
Bedekar et al.

(10) Patent No.: US 9,439,106 B2
(45) Date of Patent: Sep. 6, 2016

(54) MOBILE BACKHAUL DYNAMIC QOS BANDWIDTH HARMONIZATION (71) Applicant: Nokia Siemens Networks Oy, Espoo (FI)

(72) Inventors: Anand S. Bedekar, Arlington Heights, IL (US); Thomas Gemmer, Munich (DE); Joao Gustavo Kluck Gomes, Mountain View, CA (US); Nir Zinger, Moshav Burgata (IL); Heikki-Stefan Almay, Helsinki (FI); Giuseppe Targia, Munich (DE); Raul Pombo, Hawthorn Woods, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 20 days.

(21) Appl. No.: 13/669,900

(22) Filed: Nov. 6, 2012

(65) Prior Publication Data

US 2014/0126358 A1   May 8, 2014

(51) Int. Cl.
*H04W 28/24* (2009.01)
*H04W 28/02* (2009.01)
*H04L 12/801* (2013.01)
(Continued)

(52) U.S. Cl.
CPC .......... *H04W 28/24* (2013.01); *H04L 47/127* (2013.01); *H04L 47/24* (2013.01); *H04L 47/30* (2013.01); *H04W 28/02* (2013.01)

(58) Field of Classification Search
CPC . H04L 47/522; H04L 47/30; H04L 12/2684; H04L 1/1874; H04L 47/823; H04L 47/826; H04L 47/781; H04L 12/24
USPC ................................. 370/230, 320; 455/408
See application file for complete search history.

(56) References Cited

U.S. PATENT DOCUMENTS 6,885,638 B2    4/2005  Xu et al. ................. 370/230
6,980,511 B1 * 12/2005  Li et al. .................. 370/230
(Continued)

FOREIGN PATENT DOCUMENTS

WO      WO 0209358 A2      1/2002
WO      WO 03013175 A2     2/2003
WO      WO 03084152 A1 * 10/2003

OTHER PUBLICATIONS

"Quality of Service (QoS) and Policy Management in Mobile Data Networks: Validating Service Quality to Ensure Subscriber Quality of Experience (QoE)", XIXIA, 915-2731-01 Rev B, Jul. 2011.

(Continued)

*Primary Examiner* — Andrew Chriss
*Assistant Examiner* — Voster Preval
(74) *Attorney, Agent, or Firm* — Harrington & Smith (57) ABSTRACT

An embodiment includes determining estimate(s) of bandwidth for class(es) of quality of service to be implemented in base station(s) for service(s) provided to user equipment by the base station(s), determining expiration time(s) for corresponding ones of the estimate(s) of bandwidth, and communicating indications of the same toward mobile backhaul node(s). At a backhaul node, the indications are received and, based on the received indications, downstream bandwidth is modified for user equipment of different quality of service classes, wherein the downstream bandwidth passes through the mobile backhaul node toward the base station(s). Apparatus, software, and computer program products are also disclosed.

22 Claims, 9 Drawing Sheets (51) Int. Cl.
*H04L 12/851* (2013.01)
*H04L 12/835* (2013.01)

(56) References Cited

U.S. PATENT DOCUMENTS

| | | | |
|---|---|---|---|
| 2004/0033806 A1 | 2/2004 | Daniel et al. | 455/450 |
| 2008/0130495 A1* | 6/2008 | Dos Remedios et al. | 370/230 |
| 2012/0155298 A1 | 6/2012 | Yang et al. | 370/252 |
| 2012/0196566 A1* | 8/2012 | Lee et al. | 455/408 |

OTHER PUBLICATIONS

3GPP TS 23.203 V11.7.0 (Sep. 2012), Technical Specification, 3$^{rd}$ Generation Partnership Project; Technical Specification Group Services and System Aspects; Policy and Charging Control Architecture (Release 11), (178 pages).

3GPP TS 23.401 V11.3.0 (Sep. 2012), Technical Specification, 3$^{rd}$ Generation Partnership Project, Technical Specification Group Services and System Aspects; General Packet Radio Service (GPRS) Enhancements for Evolved Universal Terrestrial Radio Access Network (E-UTRAN) Access (Release 11), (283 pages).

3GPP TS 23.207 V11.0.0 (Sep. 2012), Technical Specification, 3$^{rd}$ Generation Partnership Project; Technical Specification Group Services and System Aspects; End-to-End Quality of Service (QoS) Concept and Architecture (Release 11), (39 pages).

3GPP TS 23.107 V11.0.0 (Jun. 2012), Technical Specification, 3$^{rd}$ Generation Partnership Project; Technical Specification Group Services and System Aspects; Quality of Service (QoS) Concept and Architecture (Release 11), (42 pages).

"MEF 22.1 Draft"; Mobile Backhaul Implementation Agreement Phase 2; DRAFT; Jan. 2010; Los Angeles, California.

* cited by examiner

QCI to DSCP Mapping

| QCI | Resource Type | Priority | Packet Delay Budget | Packet Loss Rate | LTE Traffic Class — Example LTE User Services (3GPP23.203) | DSCP (dec) | PHB |
|---|---|---|---|---|---|---|---|
| 1 | GBR | 2 | 100 ms | $10^{-2}$ | Conversational Voice | 46d | EF |
| 2 | GBR | 4 | 150 ms | $10^{-3}$ | Conversational Video (Live Streaming) | 26d | AF31 |
| 3 | GBR | 5 | 300 ms | $10^{-6}$ | Non-Conversational Video (Buffered Streaming) | 46d | EF |
| 4 | GBR | 3 | 50 ms | $10^{-3}$ | Real Time Gaming | 28d | AF32 |
| 5 | Non-GBR | 1 | 100 ms | $10^{-6}$ | IMS Signaling | 34d | AF41 |
| 6 | Non-GBR | 6 | 300 ms | $10^{-6}$ | Video (Buffered Streaming) | 18d | AF21 |
| 7 | Non-GBR | 7 | 100 ms | $10^{-3}$ | Voice, Video (Live Streaming), Interactive Gaming | 20d | AF22 |
| 8 | Non-GBR | 8 | 300 ms | $10^{-6}$ | TCP-based (e.g., www, e-mail, chat, ftp, p2p file sharing, progressive video, etc.) | 10d | AF11 |
| 9 | Non-GBR | 9 | 300 ms | $10^{-6}$ | | 0d | BE |

MOBILE BACKHAUL DYNAMIC QOS BANDWIDTH HARMONIZATION

TECHNICAL FIELD

This invention relates generally to wireless communication systems and, more specifically, relates to mobile backhaul in wireless communication systems.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below at the end of the specification but prior to the claims.

Today's 4G mobile broadband networks include interconnected Radio Access Network (RAN)s, Mobile Backhaul (MBH) networks and Evolved Packet Core (EPC) networks. Traffic from the RAN/EPC is transported by the MBH networks, making these networks a critical component for providing optimized end-to-end Quality of Service (QoS). In addition, QoS and its implementation of traffic bandwidth management is becoming more critical in order to deliver optimized network performance and minimize the need for additional equipment investment.

However, there are situations in which the MBH networks can be improved.

SUMMARY

This section contains examples of possible implementations and is not meant to be limiting.

An exemplary apparatus includes one or more processors and one or more memories including computer program code. The one or more memories and the computer program code are configured to, with the one or more processors, cause the apparatus to perform at least the following: determining, for one or more base stations capable of providing radio frequency communication with a plurality of user equipment, one or more estimates of bandwidth for one or more classes of quality of service to be implemented in the one or more base stations for one or more services provided to the plurality of user equipment by the one or more base stations; determining one or more expiration times for corresponding ones of the one or more estimates of bandwidth for the one or more classes of quality of service to be implemented in the one or more base stations; and communicating toward one or more mobile backhaul nodes one or more indications of the one or more estimates of the bandwidth for the one or more classes of quality of service to be implemented in the one or more base stations and one or more indications of the one or more expiration times.

An exemplary computer program product includes a computer-readable medium bearing computer program code embodied therein for use with a computer, the computer program code including: code for determining, for one or more base stations capable of providing radio frequency communication with a plurality of user equipment, one or more estimates of bandwidth for one or more classes of quality of service to be implemented in the one or more base stations for one or more services provided to the plurality of user equipment by the one or more base stations; code for determining one or more expiration times for corresponding ones of the one or more estimates of bandwidth for the one or more classes of quality of service to be implemented in the one or more base stations; and code for communicating toward one or more mobile backhaul nodes one or more indications of the one or more estimates of the bandwidth for the one or more classes of quality of service to be implemented in the one or more base stations and one or more indications of the one or more expiration times.

In another exemplary embodiment, a method is disclosed that includes: determining, for one or more base stations capable of providing radio frequency communication with a plurality of user equipment, one or more estimates of bandwidth for one or more classes of quality of service to be implemented in the one or more base stations for one or more services provided to the plurality of user equipment by the one or more base stations; determining one or more expiration times for corresponding ones of the one or more estimates of bandwidth for the one or more classes of quality of service to be implemented in the one or more base stations; and communicating toward one or more mobile backhaul nodes one or more indications of the one or more estimates of the bandwidth for the one or more classes of quality of service to be implemented in the one or more base stations and one or more indications of the one or more expiration times.

A further exemplary embodiment is an apparatus including: means for determining, for one or more base stations capable of providing radio frequency communication with a plurality of user equipment, one or more estimates of bandwidth for one or more classes of quality of service to be implemented in the one or more base stations for one or more services provided to the plurality of user equipment by the one or more base stations; means for determining one or more expiration times for corresponding ones of the one or more estimates of bandwidth for the one or more classes of quality of service to be implemented in the one or more base stations; and means for communicating toward one or more mobile backhaul nodes one or more indications of the one or more estimates of the bandwidth for the one or more classes of quality of service to be implemented in the one or more base stations and one or more indications of the one or more expiration times.

An additional exemplary apparatus includes one or more processors and one or more memories including computer program code. The one or more memories and the computer program code are configured to, with the one or more processors, cause the apparatus to perform at least the following: receiving, at a mobile backhaul node, one or more indications of one or more estimates of bandwidth for one or more classes of quality of service to be implemented in one or more base stations for one or more services provided to a plurality of user equipment by the one or more base stations and one or more indications of expiration times for corresponding ones of the one or more estimates of bandwidth for the one or more classes of quality of service to be implemented in the one or more base stations; and modifying, based on the received indications, downstream bandwidth for user equipment of different quality of service classes, wherein the downstream bandwidth passes through the mobile backhaul node toward the one more base stations.

An exemplary computer program product includes a computer-readable medium bearing computer program code embodied therein for use with a computer, the computer program code including: code for receiving, at a mobile backhaul node, one or more indications of one or more estimates of bandwidth for one or more classes of quality of service to be implemented in one or more base stations for one or more services provided to a plurality of user equipment by the one or more base stations and one or more indications of expiration times for corresponding ones of the one or more estimates of bandwidth for the one or more classes of quality of service to be implemented in the one or more base stations; and code for modifying, based on the received indications, downstream bandwidth for user equipment of different quality of service classes, wherein the downstream bandwidth passes through the mobile backhaul node toward the one more base stations.

An additional exemplary method includes: receiving, at a mobile backhaul node, one or more indications of one or more estimates of bandwidth for one or more classes of quality of service to be implemented in one or more base stations for one or more services provided to a plurality of user equipment by the one or more base stations and one or more indications of expiration times for corresponding ones of the one or more estimates of bandwidth for the one or more classes of quality of service to be implemented in the one or more base stations; and modifying, based on the received indications, downstream bandwidth for user equipment of different quality of service classes, wherein the downstream bandwidth passes through the mobile backhaul node toward the one more base stations.

A further exemplary apparatus includes the following: means for receiving, at a mobile backhaul node, one or more indications of one or more estimates of bandwidth for one or more classes of quality of service to be implemented in one or more base stations for one or more services provided to a plurality of user equipment by the one or more base stations and one or more indications of expiration times for corresponding ones of the one or more estimates of bandwidth for the one or more classes of quality of service to be implemented in the one or more base stations; and means for modifying, based on the received indications, downstream bandwidth for user equipment of different quality of service classes, wherein the downstream bandwidth passes through the mobile backhaul node toward the one more base stations.

DETAILED DESCRIPTION OF THE DRAWINGS

Figure 1:
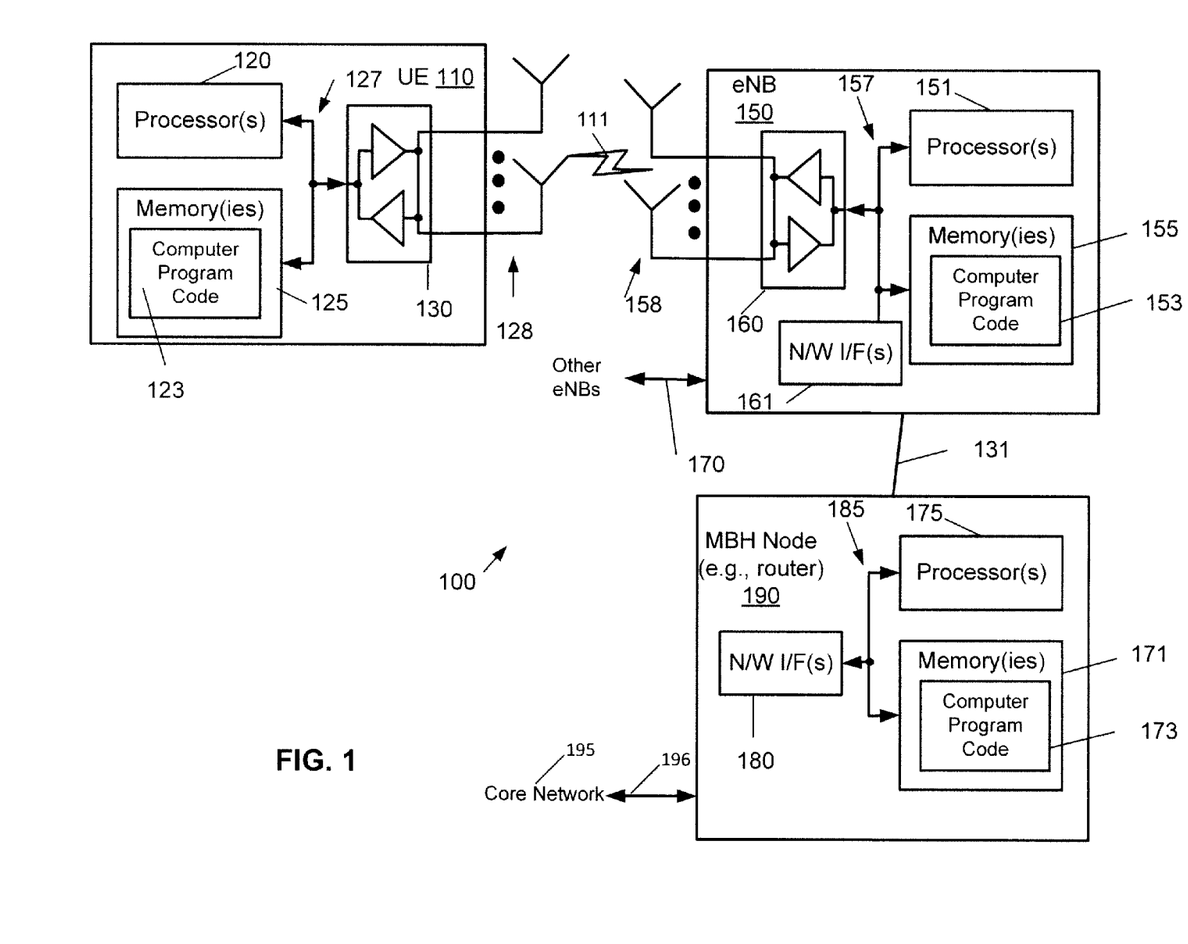
FIG. 1 illustrates an exemplary system in which the exemplary embodiments of the instant invention may be practiced.

As stated above, there are situations in which the MBH networks can be improved. Before proceeding with descriptions of these situations, reference is now made to FIG. 1, which shows a block diagram of an exemplary system in which the exemplary embodiments may be practiced. In FIG. 1, a UE 110 is in wireless communication with a mobile network 100. The user equipment 110 includes one or more processors 120, one or more memories 125, and one or more transceivers 130 interconnected through one or more buses 127. The one or more transceivers 130 are connected to one or more antennas 128. The one or more memories 125 include computer program code 123. The UE 110 communicates with eNB 150 via link 111. In a typical scenario and as described in more detail below, there will be multiple UEs 110 and multiple eNBs 150. However, for simplicity, FIG. 1 only shows a single UE 110 and a single eNB 150.

The eNB 150 includes one or more processors 151, one or more memories 155, one or more network interfaces (N/W I/F(s)) 161, and one or more transceivers 160 interconnected through one or more buses 157. The one or more transceivers 160 are connected to one or more antennas 158. The one or more memories 155 include computer program code 153. In exemplary embodiments, the one or more memories 155 and the computer program code 153 are configured to, with the one or more processors 151, cause the eNBs 150 to perform one or more of the operations as described herein. The one or more network interfaces 161 communicate over links such as the links 170 and 131. Two or more eNBs 150 communicate using, e.g., link 170. The link 170 may be wired or wireless or both and may implement, e.g., an X2 interface.

The mobile network 100 may include one or more MBH nodes 190, which provide connectivity with a further network, such as the core network (e.g., EPC) 195. Link 196 may use the S1 interface for instance to connect the MBH node 190 to the core network 195. For ease of reference, only one MBH node 190 is shown in FIG. 1. The core network 195 may provide connectivity with additional networks (not shown), such as telephone networks and/or a data communications network (e.g., the Internet). The eNB 150 is coupled via a network 131 to the MBH node 190. The network 131 may be implemented as, e.g., an S1 interface. The MBH node 190 includes one or more processors 175, one or more memories 171, and one or more network interfaces (N/W I/F(s)) 180, interconnected through one or more buses 185. The one or more memories 171 include computer program code 173. In exemplary embodiments, the one or more memories 171 and the computer program code 173 are configured to, with the one or more processors 175, cause the MBH node 190 to perform one or more operations described herein.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 151, and 175 may be of any type suitable to the local technical environment, and may include one or more of general purpose computers, special purpose computers, microprocessors, digital signal processors (DSPs) and processors based on a multi-core processor architecture, as non-limiting examples.

As stated above, QoS and its implementation of traffic bandwidth management is becoming more critical in order to deliver optimized network performance and minimize the need for additional equipment investment. Operators want to differentiate users to provide differentiated services and charge premium rates. RAN and EPC technology are available today to perform differentiation at the end-user level (e.g., Gold, Silver and Bronze users), however the lack of traffic bandwidth harmonization between RAN/EPC and MBH cause unexpected results under some circumstances. Particularly, while RAN/EPC QoS mechanisms are well defined by 3GPP standards for mobile broadband (See, e.g., for LIE from release 8, 3GPP TS 23.207 & TS 23.107), there is no specific standard mechanism for MBH and different transport technologies and QoS traffic bandwidth management implementation are used. This creates un-harmonized RAN/EPC and MBH bandwidth allocation.

Figure 2:
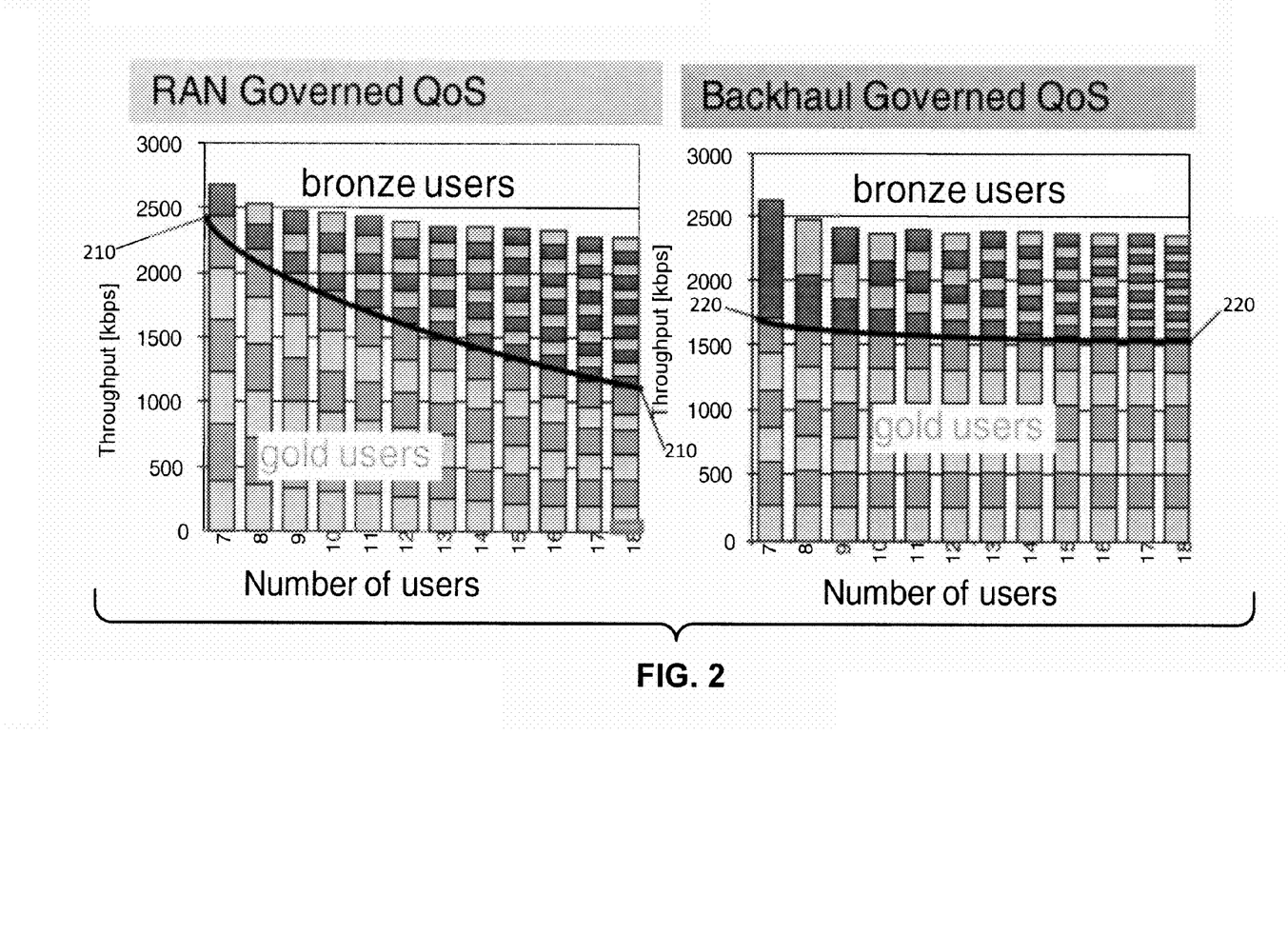
FIG. 2 is a comparison of RAN-governed QoS and corresponding bandwidth and backhaul-governed QoS and corresponding bandwidth for an un-harmonized implementation.

This lack of bandwidth harmonization between RAN/EPC and backhaul QoS framework creates challenges to enforce the desired service/user differentiation in current mobile networks as explained in reference to FIG. 2. FIG. 2 is a comparison of RAN-governed QoS and corresponding bandwidth and backhaul-governed QoS and corresponding bandwidth for an un-harmonized implementation. This example illustrates from 7 to 18 users. For "RAN Governed QoS", "Gold users" are shown below line 210 and "Bronze users" are shown above line 210. For "Backhaul Governed QoS", Gold users are shown below line 220 and Bronze users are shown above line 220.

The left diagram (entitled "RAN Governed Qos") in FIG. 2 illustrates the desired differentiation behavior as determined by the mobile operator. Gold users should always have better relative services than Bronze users regardless of the number of subscribers in the network. This behavior is enforced by the RAN and EPC at the subscriber level and should be respected by the MBH network. The right diagram (entitled "Backhaul Governed QoS") in FIG. 2 illustrates the impact of the traditional MBH "per hop behavior" QoS implementation over the expected RAN/EPC behavior. The different traffic classes (e.g., Gold, Silver and Bronze classes) are handled by the MBH nodes with classical packet QoS configurations. For example, every traffic class may be assigned a fixed scheduler-weight in a packet-scheduler, where the scheduler-weight is usually defined statically in the planning phase and represents a fixed allocation of the transmission bandwidth that the specific class will receive in case of congestion. As these weights are fixed, the proportion of traffic for the different traffic classes is also fixed in case of congestion. If the actual relation of subscribers assigned to different subscriber groups (here "Gold" and "Bronze") deviates from the defined engineering/planning assumptions, the expected behavior does not happen. In the right diagram of FIG. 2, the Gold users are getting a fixed allocation of the capacity regardless of the number of users. As a consequence, the Bronze users may perceive a very bad service quality that varies significantly based on the number of users. However, at the left bar of the right diagram, the single bronze user is getting much better performance than each one of the seven gold users in this instance. The intention of the operator in this case was to give a better "relative service" to the Gold users, but not constraining the Bronze users as illustrated in most parts of the left diagram. On the other hand, if only a small number of Bronze users is connected to a RAN, Bronze users can receive a much better relative service quality as compared to what was planned by the network operator. Many other deviations from the expected behavior happen due to the un-harmonized traffic bandwidth allocations between RAN/EPC and MBH.

All the planning regarding traffic engineering to support different service classes is done in advance and based on statistical expectations and assumptions. Dynamic effects and variations are not considered in the QoS design due to the absence of any interaction between RAN/EPC and MBH.

Figure 3:
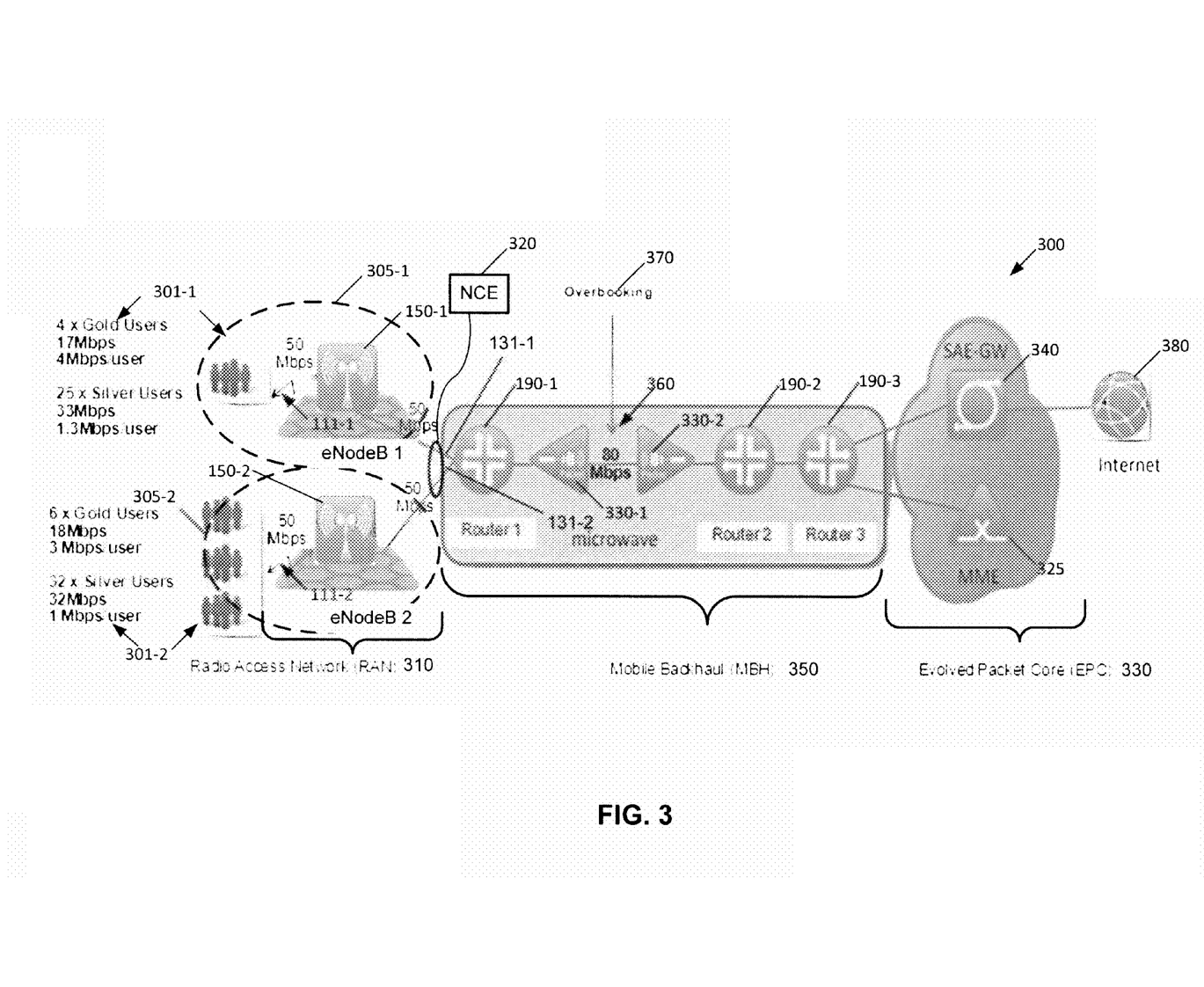
FIG. 3 is an example of a mobile network 100, used to illustrate both a problem with conventional systems and exemplary embodiments of the instant invention.

Another manifestation of the problem is depicted in FIG. 3. It is noted that FIG. 3 is also used to illustrate exemplary embodiments herein. FIG. 3 shows a mobile network 300 that includes a Radio Access Network (RAN) 310, a Mobile Backhaul (MBH) network 350, and an Evolved Packet Core (EPC) 330. The RAN 310 includes two eNodeBs, eNodeB 1 150-1 and eNodeB 2 150-2. Each eNodeB 150 forms a corresponding coverage area 305. A coverage area 305 is typically formed from multiple cells. That is, there can be multiple cells per eNB. For instance, there could be three cells for a single eNodeB carrier frequency and associated bandwidth, each cell covering one-third of a 360 degree area so that the single eNodeB's coverage area 305 covers an approximate oval or circle. Furthermore, each cell can correspond to a single carrier and an eNodeB may use multiple carriers. So if there are three 120 degree cells per carrier and two carriers, then the eNodeB 150 has a total of six cells to form the coverage area 305.

In this example, the eNodeB 150-1 serves a group 301-1 of users. In the group 301-1 of users, there are 29 users, each of which corresponds to a single user equipment 110. The eNodeB 150-2 serves a group 301-3 of 38 users, each of which corresponds to a single user equipment 110.

Each eNodeB 150 communicates with the MBH network 350 via the links 131. The Network Control Element (NCE) 320 is an optional node that may be coupled to one or both of the eNodeBs 305 and may perform operations described herein for exemplary embodiments of the instant invention.

The MBH network 350 includes a plurality of MBH nodes 190-1 to 190-3, which are routers in this example. The MBH network 350 also includes microwave communication equipment 330-1 and 330-2, which communicate using microwave link 360.

The EPC 330 is an example of the core network 190 of FIG. 1, and the EPC 330 includes in this example the SAE-GW 340 and the MME 325. However, there could be other nodes in the EPC 330 and FIG. 3 is merely exemplary. The EPC 330 is connected to the Internet 380 in this example.

To describe a problem associated with a conventional mobile system 300, assume an operator wants to enforce that Gold users receive three times more bandwidth than Silver users to differentiate the services. In a specific moment there are, in eNodeB #1 150-1, four Gold and 25 Silver subscribers that will share the 50 Mbps spectrum capacity over link 111-1 and link 113-1, providing 4 Mbps per Gold-user and 1.3 Mbps per Silver-user and enforcing the desired differentiation. In eNodeB #2 115-2, there are 6 Gold and 32 Silver subscribers that will share the 50 Mbps spectrum capacity over link 111-2 and link 113-2, providing 3 Mbps per Gold-user and 1 Mbps per Silver-user.

In the backhaul, there is an overbooked (indicated by reference 370) microwave link 360 of 80 Mbps that should be shared amongst the eNodeBs 150 and users 301 respecting the desired differentiation enforcement. The link 360 is overbooked because the 80 Mbps provided by the link cannot handle the 100 Mbps from both of the links 131-1, 131-2.

In order to implement the desired behavior, the router (e.g., router 1 190-1) needs to be aware of the base station status which is not possible without the exemplary embodiments herein. In the current backhaul technology, the QoS schedulers (not shown in FIG. 3) of the router 190-1 are defined statically based on an offline network planning process. The proportion by which the link (in this example, the microwave link 360) is shared is thus fixed and defined by the configured scheduler-weight, and therefore is totally blind to the actual number of subscribers.

Figure 4:
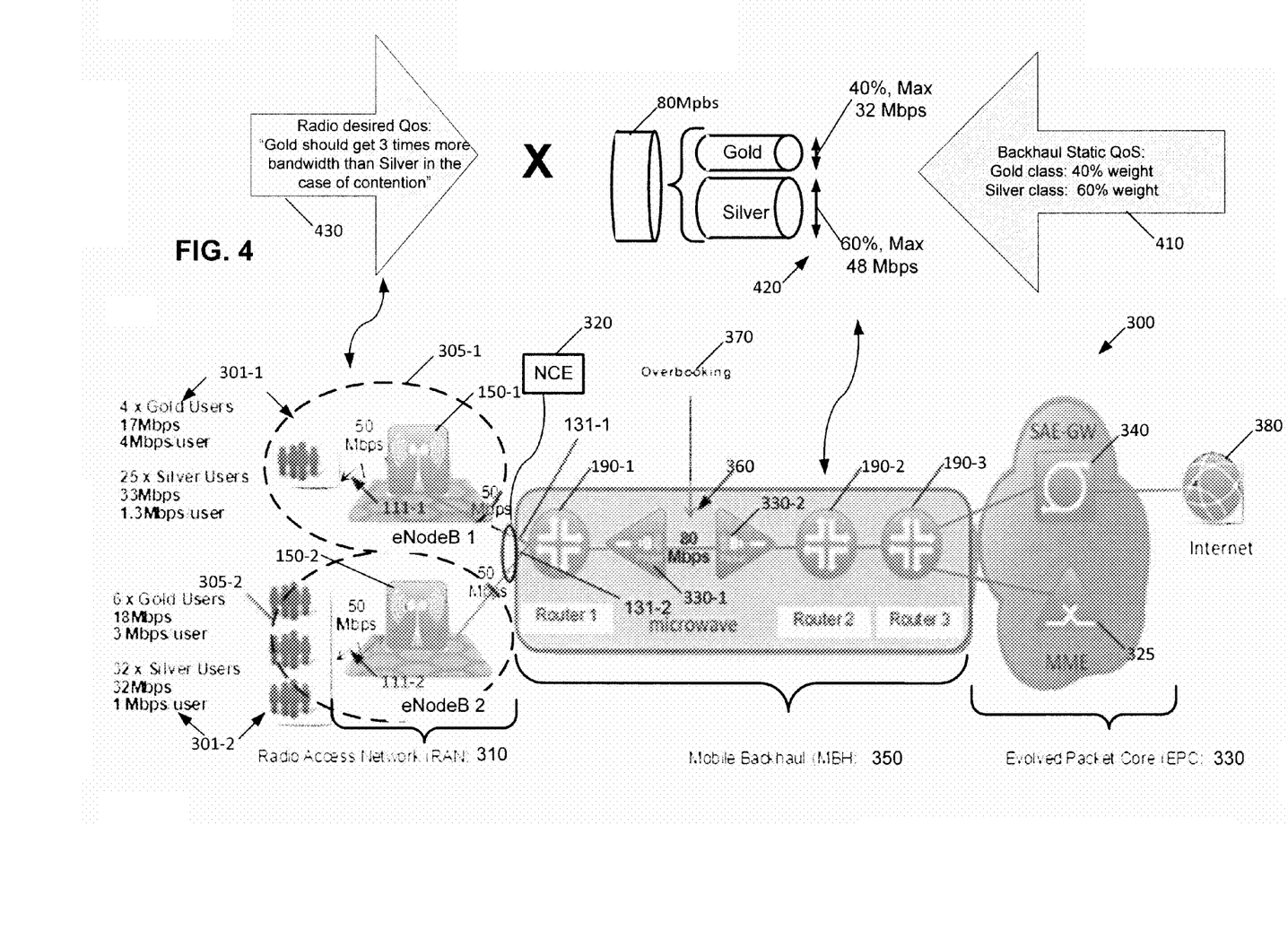
FIG. 4 is a more specific example using the system of FIG. 3.

In the diagram of FIG. 4, the issue is detailed with a real example. The operator has defined that, in case of congestion, Gold Traffic Class in the backhaul should get a maximum of 40% of the link-capacity (40%×80 Mbps=32 Mbps) and Silver Traffic Class in the backhaul a maximum of 60% (60%×80 Mbps=48 Mbps). See the arrow 410 and the reference 420.

In this situation, the Gold users will fully utilize the allocated capacity in the backhaul (32 Mbps) leaving 48 Mbps for the Silver users. As a consequence the "per-user throughput ratio" will be the following result:

Gold users get 32 Mbps for 10 subs (subscribers), which is 3.2 Mbps/sub (subscriber, a user 301); and Silver users get 48 Mbps for 57 subs, which is 0.8 Mbps/sub.

Thus, the Gold users are getting four times more bandwidth in the MBH network 350 than the Silver users, clearly not enforcing the desired behavior in the RAN that is "Gold should get 3 times more bandwidth than Silver in the case of contention" (see arrow 430).

Figure 5:
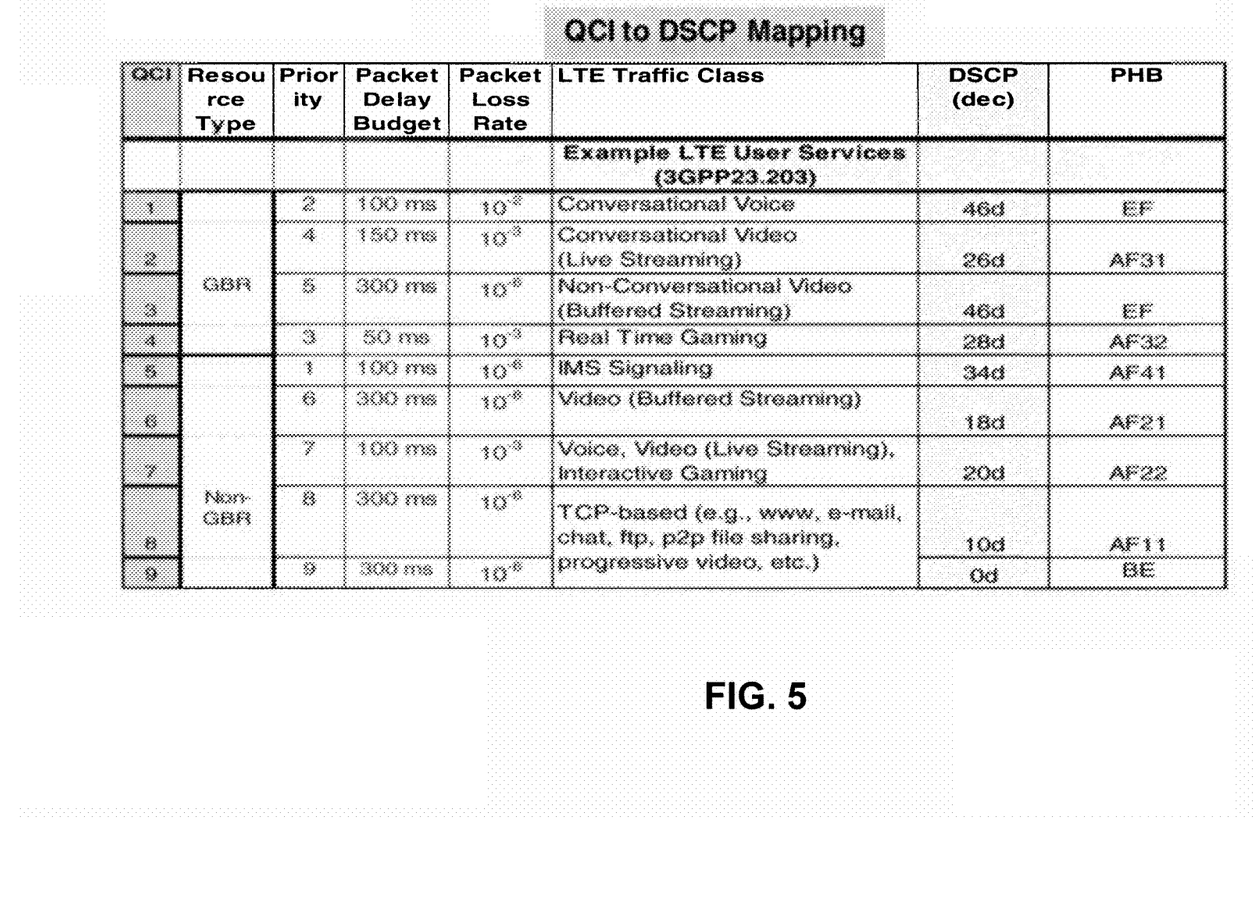
FIG. 5 is a table of exemplary QCI to DSCP mapping.

Turning to FIG. 5, this figure is a table of exemplary QCI to DSCP mapping and is used to illustrate further problems with conventional systems. Some of this information is similar to the information in Table 6.1.7, Standardized QCI characteristics, 3GPP TS 23.203 V11.7.0 (2012-09). The DSCP is typically a 6-bit value, in this example shown as decimal ("dec"), so 46 d is 46 decimal. The per-hop behavior (PHB) is classified as EF (Expedited Forwarding), AF (Assured Forwarding), and BE (Best Effort). To implement appropriate per-hop behavior within the MBH domain, DSCP are mapped to separate queues. Differentiated service for packets in these different queues demands the network operator to configure weights and priorities for these queues. As of today, this is a static configuration, depending on the network operator's assumption on the distribution of end customers and their usage of services. Each queue is again statically assigned different priorities, weights and minimum rates. As described above, the static QoS configuration in the MBH network elements under certain conditions results in a severe mismatch between planned and real bandwidth per connected UE.

To reduce or eliminate these exemplary problems, an exemplary embodiment of the instant invention, e.g., if implemented in mobile network 300 of FIG. 3, could harmonize QoS bandwidth of the MBH network 350 with the QOS bandwidth of the RAN 310. Exemplary embodiments herein include a method of extracting, calculating and time stamping QoS traffic bandwidth related information from the RAN eNodeB schedulers, inserting this information unobtrusively in upstream packets and having the traffic schedulers of MBH routers and/or switches (as MBH nodes 190), use this information to harmonize their downstream QoS traffic bandwidth to match that of the RAN eNodeB schedulers, thereby avoiding congestion and bottlenecks. These exemplary techniques will eliminate the problems stated above. In terms of FIG. 4, for instance, an exemplary embodiment of the instant invention can dynamically modify the bandwidth for Silver users from 48 Mbps to another bandwidth that respects the desired radio-enforcement that is providing Gold users with three times more bandwidth than Silver users.

In certain exemplary embodiments herein, the RAN eNodeB per sector (e.g., or per sector carrier) uniquely calculates and time stamps QoS class queue (e.g., relative) bandwidth related information from a (e.g., radio) scheduler, inserts this information unobtrusively in upstream GTP-U header private extension for user-plane packets. As the GTP-U user-plane packets traverse through an MBH node such as an MBH router and/or switch, this information is fetched and dependent upon the expiration time, the downlink (e.g., traffic) scheduler, using this information and unique calculation, harmonizes downstream QoS class queue bandwidth to match that of the radio scheduler, thereby avoiding congestion and bottlenecks. In an example, the calculating, inserting, fetching and adjusting runs continuously for dynamic harmonization of the QoS traffic bandwidth of MBH routers and/or switches, thereby avoiding congestion, bottleneck and potential packet loss. The bandwidth related information could be an estimated bandwidth, a number of user equipment connected per QCI, an indication of "out of band" QoS class, e.g., where more user equipment are in one QoS class and the bandwidth for that class may not be able to handle the traffic, or where relative bandwidth increases/decreases from a previous bandwidth. Additionally, the communication of bandwidth-related information may use any standard communication protocol like SNMP (simple network management protocol) or RPC (remote procedure call) or ftp (file transport protocol) or http (hypertext transmission protocol).

Figure 6:
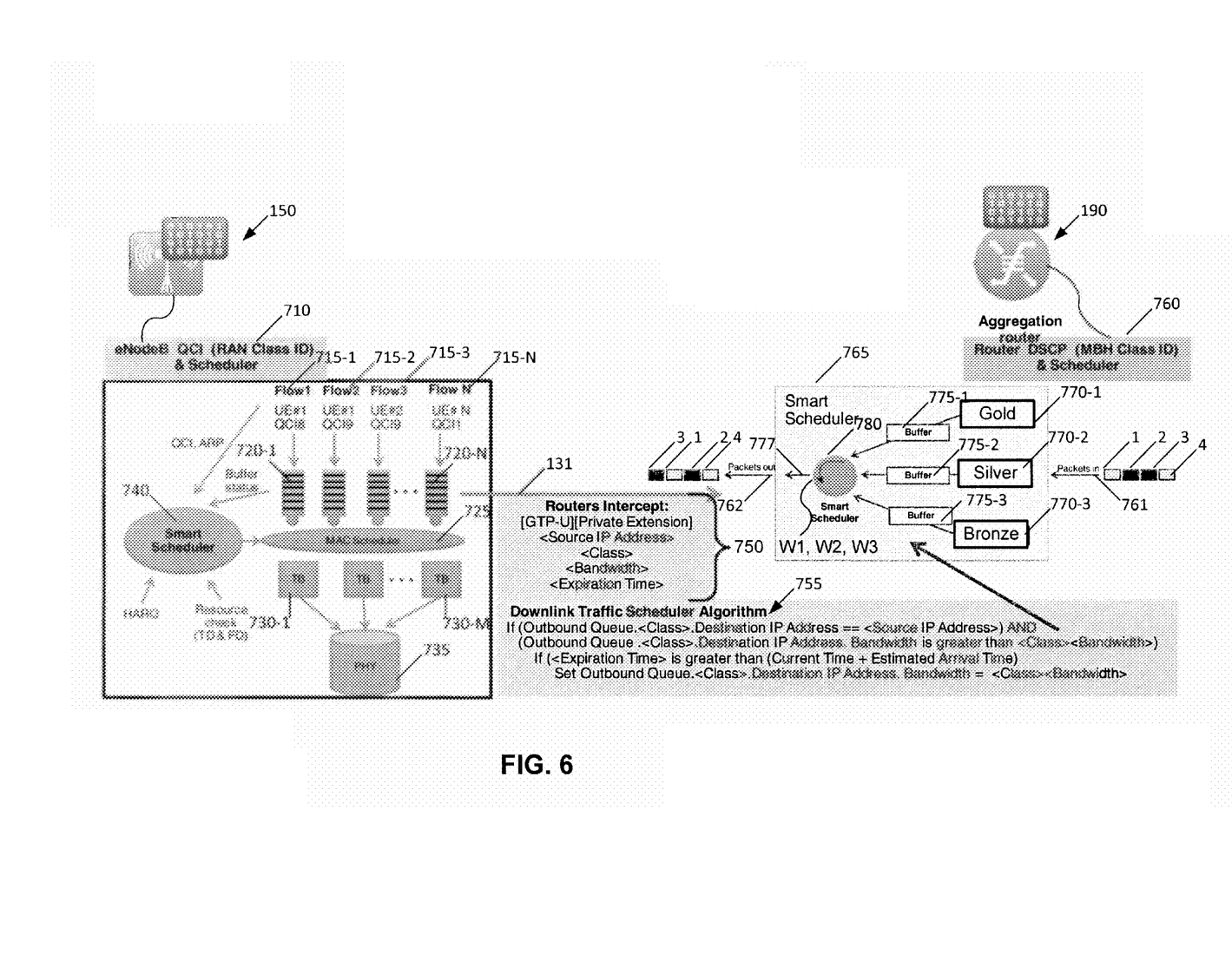
FIG. 6 is an example of eNodeB and aggregation router operation in accordance with an exemplary embodiment.

Referring to FIG. 6, an example is shown of eNodeB and aggregation router operation in accordance with an exemplary embodiment. In this example, an eNodeB 150 has a QCI (RAN Class ID) and scheduler 710, which includes a smart scheduler 740, buffers 720-1 through 720-N, a MAC scheduler 725, and a physical layer 735. The data flows 715-1 to 715-N are placed into corresponding buffers 720. Each of the data flows 715 is associated with a QCI: data flow 715-1 has QCI8; data flow 715-2 has QCI9; data flow 715-3 has QCI9; and data flow 715-N has QCI1. The MAC scheduler 725 places data from the data flows 715 into transport blocks (TBs) 730-1 through 730-M, which are transmitted to UEs 110 via the physical layer 735. The smart scheduler 740 is a radio scheduler in an example that controls the MAC scheduler 725. As indicated, the smart scheduler 740 bases scheduling on certain inputs, including HARQ (hybrid automatic repeat request), resource check (for TD, time division, and FD, frequency division UEs), buffer statuses of buffers 720, QCI, and ARP (allocation and retention priority). The smart scheduler 740 in an example calculates and adds the Bandwidth and Expiration Time shown by reference 750. Reference 750 shows one example of how Bandwidth and Expiration Time may be added to packets, through a private extension on a packet, where the private extension contains the Bandwidth and Expiration Time. This is further illustrated in FIG. 8.

An MBH node 190 which in this example is an aggregation router, includes a router DSCP (MBH Class ID) and scheduler 760, which includes a smart scheduler 765. Based in part on QoS classes 770 of Gold, Silver, and Bronze, the incoming packets 761 are placed into corresponding buffers 775. The smart scheduler 765 schedules (780) packets 761 for output based on, e.g., scheduler weights (e.g., W1, W2, W3), each weight corresponding to one of the QoS classes 770. In this example, the packets 1 and 4 belong to the Bronze QoS class 770-3, packet 3 belongs to the Silver QoS class 770-2, and packet 2 belongs to the Gold QoS class 770-1. The output packets 762 have a different order based on the weighting performed by the smart scheduler 765 in operation 780. The scheduling 780 puts output packets into a physical queue 777, which is typically implemented in hardware such as a DSP, application-specific integrated circuit (IC), or other integrated circuit, e.g., to support the required speed for packet handling. Block 755 indicates that the aggregation router 190 intercepts the packet and fetches (e.g., retrieves) indications of bandwidth ("Bandwidth") and indications of expiration time ("Expiration Time") associated with a QoS class ("Class") from an eNodeB ("Source IP Address"). The aggregation router 190 then performs a determination as to whether the bandwidth for a QoS class should be modified and performs the modification based on the determination. In this example, an algorithm performed by the smart scheduler 765 is shown by reference 755. In this example, it is first checked if the destination IP address for a packet in the output queue having a particular QoS class is a particular source LP address of an eNodeB AND whether bandwidth for the output queue having the particular QoS class is greater than the currently assigned bandwidth for the particular QoS class. If so, it is then determined if the Expiration Time is greater than the sum of the Current Time and the Estimated Arrival Time (e.g., for a packet to go from the MBH 350 to the RAN 310), and if so the bandwidth for this particular QoS class (shown as "<Class><Bandwidth>") is left unchanged. It is noted that this algorithm is merely one example and other algorithms are possible.

Figure 7:
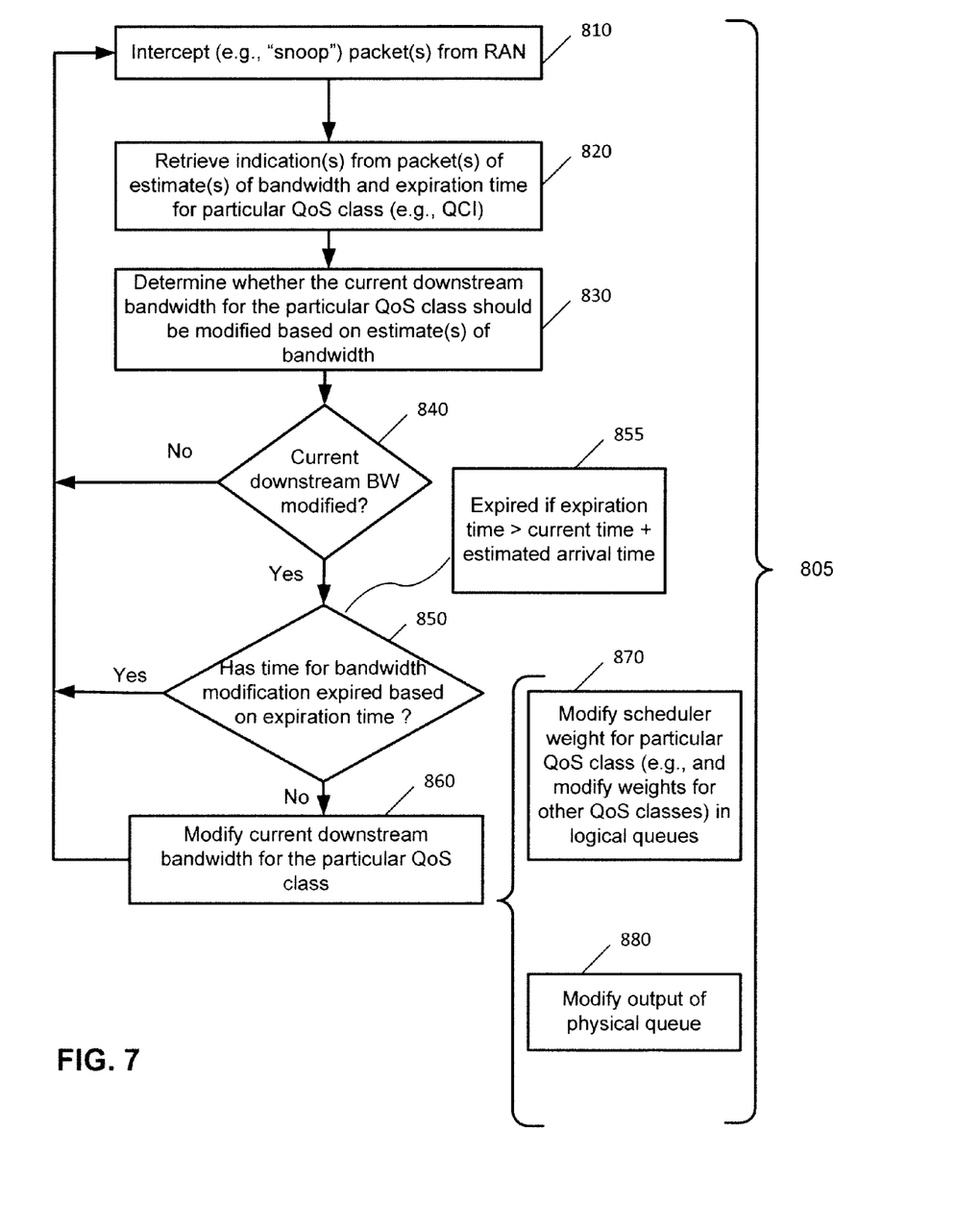
FIG. 7 is a block diagram of an exemplary logic flow diagram performed by an MBH node that illustrates the operation of an exemplary method, a result of execution of computer program instructions embodied on a computer readable memory, and/or functions performed by logic implemented in hardware, in accordance with exemplary embodiments of this invention.

FIG. 7 describes this process in more detail. FIG. 7 is a block diagram of an exemplary logic flow diagram performed by an MBH node 190 that illustrates the operation of an exemplary method, a result of execution of computer program instructions embodied on a computer readable memory, and/or functions performed by logic implemented in hardware, in accordance with exemplary embodiments of this invention. In this example, the MBH node 190 is the aggregation router shown in FIG. 6. However, this could be a switch or other element such as the NCE 320. The smart scheduler 765 may perform these operations within the aggregation router 190, or another entity in the aggregation router can perform some or all of the operations. In block 810, the aggregation router 190 intercepts (e.g., "snoops", which is a process of reading packets typically without modifying the packets) packet(s) from the RAN 310. In block 820, the aggregation router 190 retrieves (e.g., fetches) indication(s) from the packets of estimate(s) of bandwidth to be implemented in one or more base stations and expiration time for a particular QCI, which is one example of a QoS class. Examples of estimates of bandwidth are described in more detail in reference to FIGS. 8 and 9.

In block 830, it is determined if the current downstream bandwidth for the particular QoS class (e.g., as indicated by QCI of the packet(s)) should be modified based on the estimates of bandwidth. If the current downstream bandwidth (BW) should be modified (block 840=Yes), the flow proceeds to block 850, were it is determined whether the time for bandwidth modification has expired based on the indication of the expiration time. One example of block 850 is shown as block 855, where the time for bandwidth modification has expired if the expiration time is greater than a sum of the current time and an estimated arrival time (e.g., the time that it takes a packet to go from the outbound queue in the mobile backhaul to the outbound queue in the eNodeB to be sent out in the radio link). Because conditions may change rapidly at an eNodeB 150, block 850 ensures that the bandwidth is not changed based on old, stale bandwidth information. The expiration time contains a time for how long the bandwidth calculation is valid. This would typically be current time (at the time the eNodeB enters the information into the packet, per, e.g., a timestamp) plus a delta that indicates the validity of the estimates of bandwidth prediction executed by the algorithm running in the NCE. The delta is in an example a minimum of an estimate of packet roundtrip time from the RAN to the MBH node 190, e.g., 10 ms. This delta could be readjusted depending on how congested the radio scheduler queues (e.g., buffers 720) are, thus the bandwidth may be more or less likely to change based on, e.g., congestion.

In block 860, responsive to a determination the current downstream BW should be modified for the particular QoS class (block 840=Yes) and optionally the time for bandwidth modification has not expired (block 850=No), the current downstream bandwidth for the particular QoS class is modified. This may be performed through many exemplary techniques. Block 870 shows one exemplary technique, where the scheduler weight for the particular QoS class is modified (e.g., the weights for the other QoS classes are modified) for logical queues (e.g., buffers 775). For instance, in FIG. 6, weights W1, W2, and W3 correspond to QoS classes 770-1 (Gold), 770-2 (Silver), and 770-3 (Bronze), respectively. These weights could be adjusted so that the sum of the weights is one, e.g., W1+W2+W3=1. If weight W1 is increased, then weight W2 and/or weight W3 will be decreased. There may be limits to this, such as having a minimum weight for each QoS class below which the weight cannot fall, or having a maximum weight for each QoS above which the weight cannot rise. Another example is illustrated by block 880, where an output of a physical queue 777 is modified, e.g., to modify preferences for transmission of packets for QoS classes based on the estimates of bandwidth. Modifying output of the physical queue 777 may be more challenging than modifying the weights W, since the physical queue 777 is typically implemented in hardware such as a DSP or IC, but is possible.

As another example, "bandwidth per QCI" information can be applied in a standard router H-QoS-framework to produce the expected radio-governed QoS, thereby making the backhaul Radio aware. For example, the router can apply a class weight for the class corresponding to QCI i equal to the ratio of Sum (bandwidth consumed of QCI_i over all eNodeB) to the Sum (bandwidth consumed by all QCIs over all eNodeB), where the bandwidth of QCI i is sent by each eNB to the router as per the proposed techniques described below. Additionally, the router may apply a burstiness or overprovisioning factor in the numerator of this ratio to allow for variability in the bandwidth provided to a given QCI class over the radio interface. For instance, in case a specific QCI transport traffic from valuable customers, a provider might want to always overprovision this traffic a little bit (e.g., a 10%, ten percent, increase over the bandwidth prediction) in order that small fluctuations do not cause user-experience degradation The bandwidth per QCI may be per sector-carrier (i.e., per sector, per carrier).

Block 805 indicates the flow in FIG. 7 may occur per sector, and also per carrier (i.e., per sector-carrier). Block 805 may also indicate the flow in FIG. 7 may also occur per base station. That is, one might restrict this only for a particular base station (e.g., or a particular set of base stations) and then a way to identify a particular base station is by IP address. To be able to differentiate sector-carriers, this information could be included in the upstream packet as well.

Figure 8:
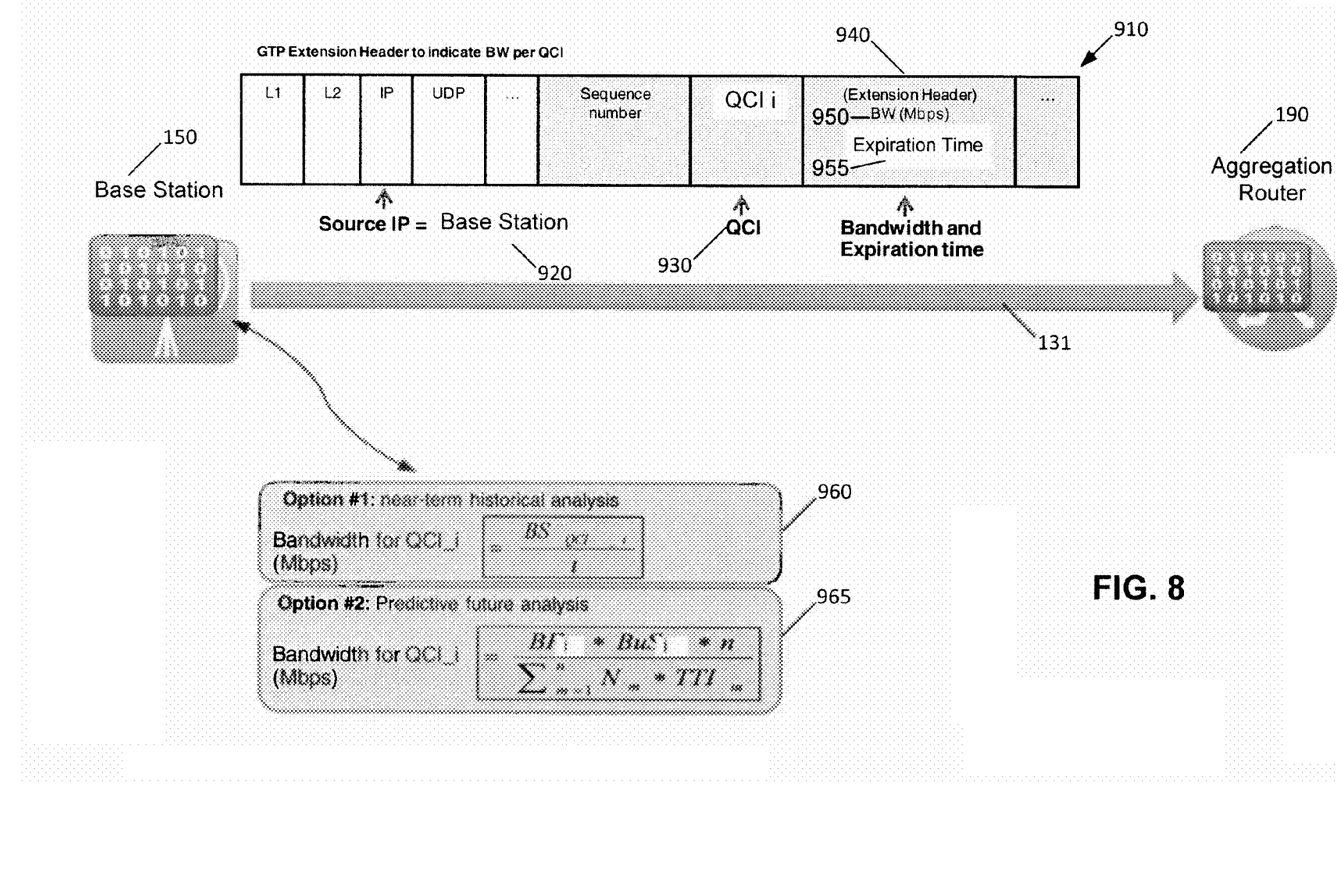
FIG. 8 is an example of eNodeB operation in accordance with an exemplary embodiment.

Referring to FIG. 8, an example is shown of eNodeB operation in accordance with an exemplary embodiment. The eNodeB 150 sends continuously (in an example), e.g., per sector-carrier and/or base station(s) an estimate of bandwidth to be implemented by the base station(s) per the following bandwidth calculations, per QCI-Class, as non-limiting examples of such calculations:

(1) Based on past real-time historical analysis 960, where the BW for QCI i $$(\text{``QCI\_i''}) = \frac{BS_{QCI\_i}}{t}$$

(e.g., number of bytes sent for this specific QCI on the last time period), where BS is the total number of bytes sent in period t, and t is t period of analysis (e.g., 10 ms); or (2) Based on predictive future real-time analysis 965, where the BW for QCI k $$(\text{``QCI\_i''}) = \frac{BF_i * BuS_i * n}{\sum_{m=1}^{n} N_m * TTI_m}$$

(e.g., number of bytes in the buffer-flows expected to be sent on next 10 ms—U-Plane roundtrip latency), where BF is a buffer overflow for QCI i (e.g., in percent), BuS is a buffer size for QCI i per data flow (e.g., in bytes), n is a number of data flows, and N*TTI is a predictive time needed to deplete the buffer (e.g., in seconds).

In this example, an indication 950 of the predicted bandwidth, BW, in Mbps (for instance) is added to an extension header of a GTP packet 910. An indication 955 of the expiration time is also added to the extension header 940. The source IP 920 of the eNodeB and the QCI 930 are already conventionally added to the GTP packet 910.

Figure 9:
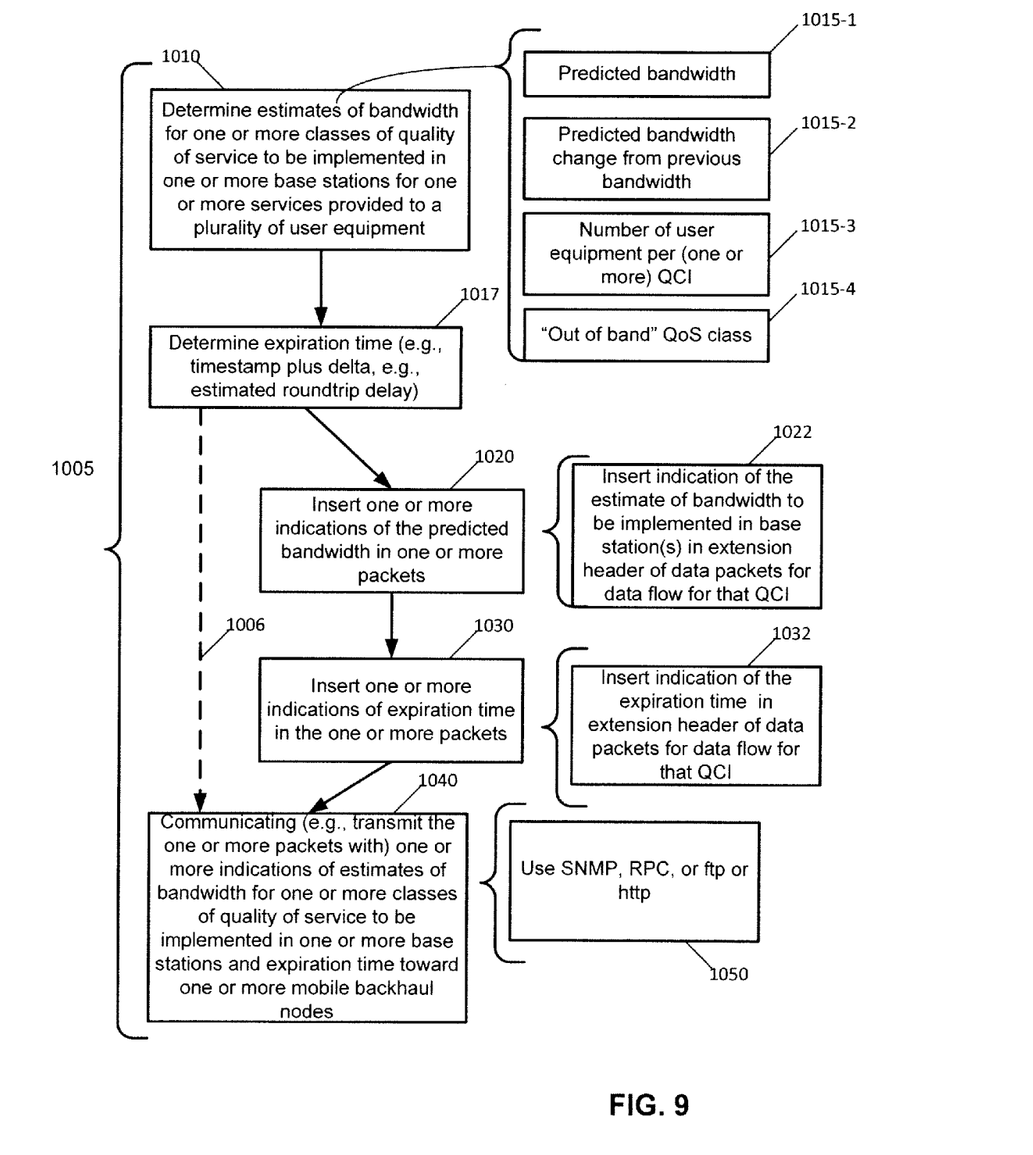
FIG. 9 is a block diagram of an exemplary logic flow diagram performed by a RAN node that illustrates the operation of an exemplary method, a result of execution of computer program instructions embodied on a computer readable memory, and/or functions performed by logic implemented in hardware, in accordance with exemplary embodiments of this invention.

Turning to FIG. 9, this figure is a block diagram of an exemplary logic flow diagram performed by a RAN node that illustrates the operation of an exemplary method, a result of execution of computer program instructions embodied on a computer readable memory, and/or functions performed by logic implemented in hardware, in accordance with exemplary embodiments of this invention. The RAN node could be an eNodeB 150, an NCE 320, or other element. The smart scheduler 740 may perform some or all of the flow in FIG. 9, or another entity in the RAN node may perform some or all of the flow. Reference 1005 is used to indicate the flow operations may be performed per sector, carrier, or base station. In block 1010, the RAN node determines estimates of bandwidth for one or more classes of quality of service to be implemented in one or more base stations for one or more services provided to a plurality of user equipment. Exemplary prediction analyses 960, 970 may be used for the estimates of bandwidth 1015-1. Other estimates of bandwidth 1015 include predicted bandwidth change 1015-2 from a previous bandwidth, which could occur for instance, if the estimates of bandwidth 1015-1 are sent periodically (e.g., every second) and then predicted bandwidth change 1015-2 (e.g., "increase bandwidth" or "bandwidth increase of 10 Mbps") are sent between the sending of the estimates of bandwidth 1015-1; or simply, "increase/decrease" bandwidth could be used for 1015-2. Another example is of an estimate of bandwidth 1015 is a number of user equipment per one or more QCI 1015-3, which informs the MBH node 190 that bandwidth for each QCI should be modified. Another example is one or more "out of band" QoS classes, which indicates which QoS class(es) are estimated to require more bandwidth. Note that these are all estimates of bandwidth to be implemented in one or more base stations, since each implies how much bandwidth for QoS class(es) are estimated to be used by the RAN node. These are merely exemplary, and other estimates of bandwidth 1015 are possible.

In block 1017, expiration times of the estimates of bandwidth 1015 are determined. In an example, the base station needs to know only the amount of time the estimate of bandwidth 1015 is valid (e.g., 10 ms after a time stamp is applied to the packet) as the packet has a time stamp. This could be informed in the packet itself. Practical implementation in an exemplary embodiment is to have a fixed amount of time for which the estimate of bandwidth 1015 is valid, otherwise the network may be too dynamic and might become unstable. In an example, the indication 955 of the expiration time added to a packet or otherwise communicated to the MBH is a timestamp for the packet plus a delta, which may be an estimated roundtrip delay from the RAN to the MBH and back from the MBH to the RAN. As explained above, however, the delta may be modified dynamically and in real-time.

In one example, as indicated by reference 1006 and block 1040, one or more indications of estimates of bandwidth for one or more classes of quality of service to be implemented in one or more base stations and expiration time are communicated toward one or more mobile backhaul nodes 190, e.g., via (block 1050) SNMP (simple network management protocol) or RPC (remote procedure call) or ftp (file transport protocol) or http (hypertext transmission protocol). Note that the expiration time in this example can be a timestamp prior to a beginning of the communication and a delta. Typically, the timestamp would taken as close as possible to the beginning of the communication.

Another example is illustrated in FIG. 8 and by blocks 1020, 1030, and 1040. In block 1020, the RAN node inserts one or more indications of the predicted bandwidth in one or more packets. One example of this is block 1022, where an indication of the estimate of bandwidth to be implemented by one or more base stations is inserted in the extension header of data packets for data flow for that QCI. An example of this is shown in FIG. 8, by reference 950. In block 1030, the RAN node inserts, in an example, one or more indications 955 of expiration time in the one or more packets. One example of this is block 1032, where an indication of the expiration time is inserted in the extension header of data packets for data flow for that QCI. An example of this is shown in FIG. 8 by reference 955. In block 1040, the RAN node transmits the one or more packets with the one or more indications toward one or more mobile backhaul nodes.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memory(ies) 155, 171 or other device) that may be any media or means that can contain and store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP third Generation Partnership Project
AF Assured Forwarding
ARP Allocation and Retention Priority
BE Best Effort
BSC Base Station Controller
BTS Base Transfer Station
BW Bandwidth
CSR Cell Site Router
DSCP Differentiated Services Code Points
DSP Digital Signal Processor
EF Expedited Forwarding
EPC Evolved Packet Core
eNB or eNodeB evolved Node B, e.g., an LIE base station
G generation, as in 2G for second generation
GGSN Gateway GPRS Support Node
GPRS General Packet Radio Service
GTP GPRS Tunneling Protocol
GW gateway
HARQ hybrid automatic repeat request
IC Integrated circuit
ID identification
IP Internet Protocol
kbps kilobits per second
LTE Long Term Evolution
MAC Media Access Control
MBH Mobile Backhaul
Mbps Mega-bits per second
MME Mobility Management Entity
ms milliseconds
NCE Network Control Element
PHB Per-Hop Behavior
QCI Quality Class Indicator, also call QoS Class Identifier
QoS Quality of Service
RAN Radio Access Network
RF Radio Frequency
RNC Radio Network Controller
SAE-GW System Architecture Evolution Gateway
SGSN Serving GPRS Support Node
TB Transport Block
TS Technical Standard
TTI Transmission Time Intervals
UE User Equipment, e.g., a mobile terminal
WFQ Weighted Fair Queuing

What is claimed is:

1. An apparatus, comprising:
one or more processors; and one or more memories including computer program code, wherein the one or more memories and the computer program code are configured, with the one or more processors, to cause the apparatus to perform or control at least the following:
determining, for one or more base stations capable of providing radio frequency communication with a plurality of user equipment, one or more estimates of bandwidth for one or more classes of quality of service to be implemented in the one or more base stations for one or more services provided to the plurality of user equipment by the one or more base stations;
determining one or more expiration times for corresponding ones of the one or more estimates of bandwidth for the one or more classes of quality of service to be implemented in the one or more base stations, wherein determining the one or more expiration times further comprises setting the one or more expiration times as being a timestamp and a delta for corresponding ones of the one or more estimates of bandwidth for the one or more classes of quality of service to be implemented in the one or more base stations; and
communicating, toward one or more mobile backhaul nodes by the one or more base stations, one or more indications of the one or more estimates of the bandwidth for the one or more classes of quality of service to be implemented in the one or more base stations and one or more indications of the one or more expiration times, wherein the one or more indications enable modification of downstream bandwidth for user equipment of different quality of service classes, wherein the one or more mobile backhaul nodes provide connectivity between the one or more base stations and a core network, and wherein the downstream bandwidth would pass through the mobile backhaul node toward the one or more base stations.

2. The apparatus of claim 1, wherein the one or more estimates of bandwidth for one or more classes of quality of service to be implemented in the one or more base stations comprise one or more real-time historical analyses of byte usage for the one or more classes of quality of service.

3. The apparatus of claim 2, wherein the one or more real-time historical analyses of byte usage for the one or more classes of quality of service comprise, for an ith quality of service class identifier ("QCI_i"), calculating $$\frac{BS_{QCI\_i}}{t},$$

where $BS_{QCI\_i}$ is a number of bytes sent for the ith quality of service class identifier for period of analysis t.

4. The apparatus of claim 1, wherein the one or more estimates of bandwidth for one or more classes of quality of service to be implemented in the one or more base stations comprise one or more predictive future real-time analyses of predicted byte usage for the one or more classes of quality of service.

5. The apparatus of claim 4, wherein the one or more predictive future real-time analyses of predicted byte usage for the one or more classes of quality of service comprise, for an ith quality of service class identifier, calculating $$\frac{BF_i * BuS_i * n}{\sum_{m=1}^{n} N_m * TTI_m}$$

where BF is a buffer overflow for the ith quality of service class identifier, BuS is a buffer size for the ith quality of service class identifier per data flow, n is a number of data flows, N*TTI is a predictive time needed to deplete the buffer, and TTI is transmission time interval.

6. The apparatus of claim 1, wherein the one or more estimates of bandwidth for one or more classes of quality of service to be implemented in the one or more base stations comprise one or more "out of band" quality of service classes, which indicate which quality of service classes are estimated to require more bandwidth.

7. The apparatus of claim 1, wherein determining further comprises determining one or more estimates of a number of connected user equipment for at least one of the one or more classes of quality of service.

8. The apparatus of claim 1, wherein communicating further comprises:
   inserting in one or more packets the one or more indications of the one or more estimates of the bandwidth for the one or more classes of quality of service to be implemented in the one or more base stations and the one or more indication of the one or more expiration times; and
   transmitting the one or more packets toward the one or more mobile backhaul nodes.

9. The apparatus of claim 8, wherein determining the one or more expiration times further comprises setting the one or more expiration times as being a timestamp corresponding to a packet and a delta for corresponding ones of the one or more estimates of bandwidth for the one or more classes of quality of service to be implemented in the one or more base stations.

10. The apparatus of claim 9, wherein the delta has a minimum value of an estimate of packet roundtrip time from the apparatus to the one or more mobile backhaul nodes.

11. The apparatus of claim 1, wherein communicating further comprises using one of simple network management protocol, remote procedure call, file transport protocol, or hypertext transmission protocol to communicate the one or more indications toward the one or more mobile backhaul nodes.

12. The apparatus of claim 1, wherein determining the one or more expiration times further comprises adjusting the delta in real-time based on how congested radio scheduler queues are for corresponding one of the one or more classes of quality of service.

13. An apparatus, comprising:
   one or more processors; and one or more memories including computer program code, wherein the one or more memories and the computer program code are configured, with the one or more processors, to cause the apparatus to perform or control at least the following:
      receiving, at a mobile backhaul node, from a base station, one or more indications of one or more estimates of bandwidth for one or more classes of quality of service to be implemented in one or more base stations for one or more services provided to a plurality of user equipment by the one or more base stations and one or more indications of expiration times for corresponding ones of the one or more estimates of bandwidth for the one or more classes of quality of service to be implemented in the one or more base stations, wherein the backhaul node provides connectivity between said base station and a core network, wherein determining the one or more expiration times further comprises fetching the one or more expiration times as being a timestamp and a delta for corresponding ones of the one or more estimates of bandwidth for the one or more classes of quality of service to be implemented in the one or more base stations; and
      modifying, based on the received indications, downstream bandwidth for user equipment of different quality of service classes, wherein the one or more indications enable modification of downstream bandwidth for user equipment of different quality of service classes, and wherein the downstream bandwidth passes through the mobile backhaul node toward the one or more base stations.

14. The apparatus of claim 13, wherein adjusting further comprises adjusting downstream bandwidth quality of service for user equipment of different classes and for the one or more base stations.

15. The apparatus of claim 14, wherein adjusting further comprises adjusting downstream bandwidth quality of service for user equipment of different classes and for different sectors in the one or more base stations.

16. The apparatus of claim 15, wherein adjusting further comprises adjusting downstream bandwidth quality of service for user equipment of different classes and for different sector-carriers in the one or more base stations.

17. The apparatus of claim 13, wherein receiving further comprising receiving one or more packets containing the one or more indications.

18. The apparatus of claim 13, wherein receiving further comprises receiving the indications using one of simple network management protocol, remote procedure call, file transport protocol, or hypertext transmission protocol.

19. The apparatus of claim 13, wherein modifying is performed in response to the expiration time being greater than a sum of a current time and an estimated arrival time for a packet from the mobile backhaul node to a base station of the one or more base stations.

20. The apparatus of claim 13, wherein modifying further comprises modifying the downstream bandwidth for the user equipment of the different quality of service classes by modifying a scheduler weight corresponding to each different quality of service class.

21. The apparatus of claim 13, wherein modifying further comprises modifying the downstream bandwidth for the user equipment of the different quality of service classes by modifying an output of a physical queue.

22. A computer program product embodied on a non-transitory computer-readable medium in which a computer program is stored that, when being executed by a computer, is configured to provide instructions to control or carry out:

determining, by a radio access network node, for one or more base stations capable of providing radio frequency communication with a plurality of user equipment, one or more estimates of bandwidth for one or more classes of quality of service to be implemented in the one or more base stations for one or more services provided to the plurality of user equipment by the one or more base stations;

determining, by the radio access network node, one or more expiration times for corresponding ones of the one or more estimates of bandwidth for the one or more classes of quality of service to be implemented in the one or more base stations, wherein determining the one or more expiration times further comprises setting the one or more expiration times as being a timestamp and a delta for corresponding ones of the one or more estimates of bandwidth for the one or more classes of quality of service to be implemented in the one or more base stations; and communicating, toward one or more mobile backhaul nodes by the radio access node, one or more indications of the one or more estimates of the bandwidth for the one or more classes of quality of service to be implemented in the one or more base stations and one or more indications of the one or more expiration times, wherein the one or more indications enable modification of downstream bandwidth for user equipment of different quality of service classes, wherein the one or more mobile backhaul nodes provide connectivity between the one or more base stations and a core network, and wherein the downstream bandwidth passes through the mobile backhaul node toward the one or more base stations.

* * * * *